Feb. 6, 1940. O. MITCHELL 2,188,953
PULLEY ASSEMBLY
Filed May 1, 1939
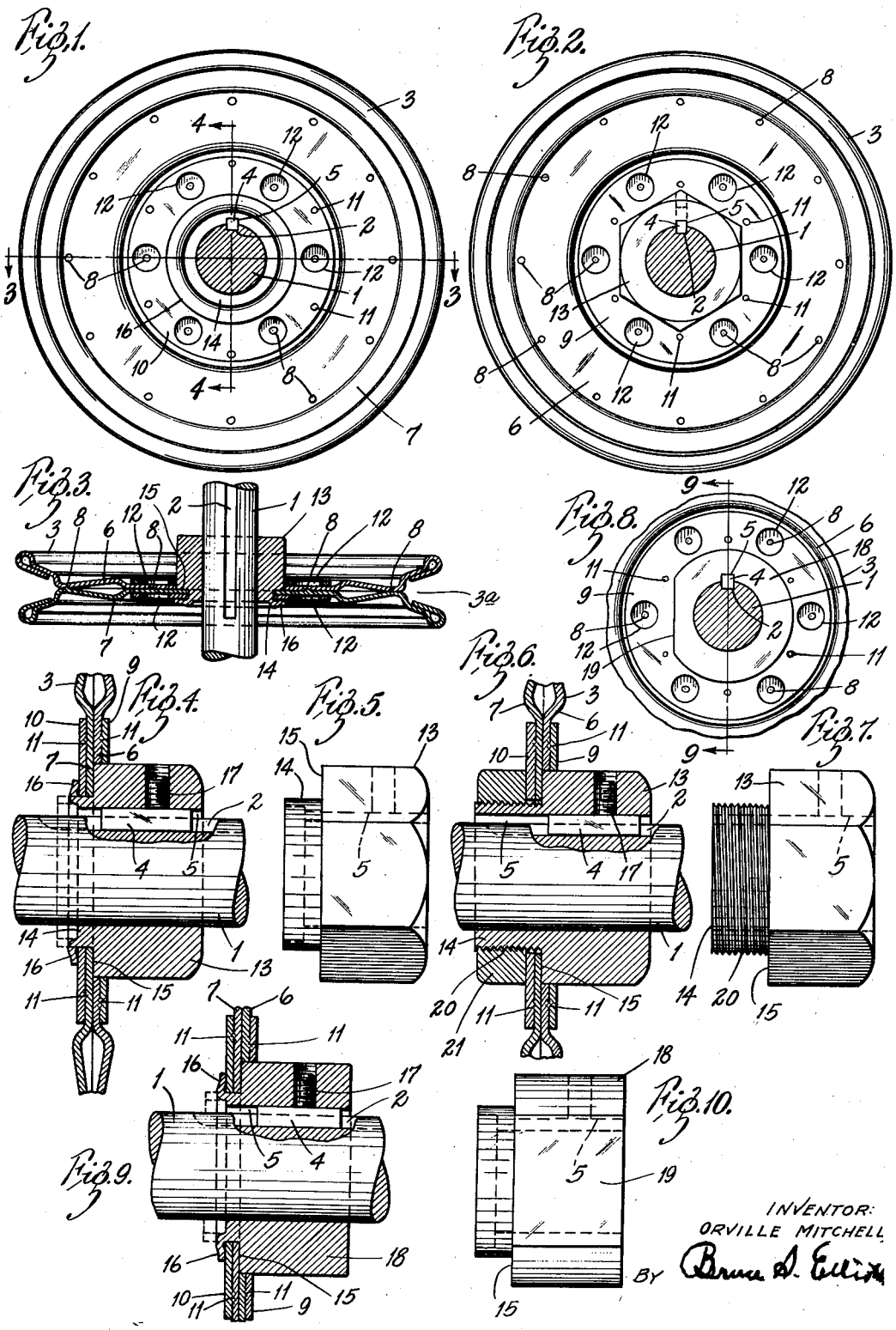
INVENTOR:
ORVILLE MITCHELL Patented Feb. 6, 1940

2,188,953

UNITED STATES PATENT OFFICE 2,188,953

PULLEY ASSEMBLY

Orville Mitchell, Dallas, Tex.

Application May 1, 1939, Serial No. 271,022

11 Claims. (Cl. 74—230.8)

This invention has for its general object to provide a novel V-belt pulley assembly which will enable different sizes of pulleys to be readily mounted on hubs having bores of a desired diameter.

As is well known, V-belt pulleys are used in great variety, the usual diameter varying from four to sixteen inches, and the bores ordinarily ranging from one-half to one and seven-sixteenth inches. In order to have on hand a complete stock involving all the possible combinations of diameter and bores, a jobber, or other dealer, would have to keep on hand a large variety of pulleys, possibly more than two hundred different kinds. To meet this situation, pulley manufacturers make their pulleys and hubs separate and use various methods for securing them together, upon receipt of an order, whereby the required combination of diameter and bore may be obtained.

My invention relates to a novel construction of hub and pulley, which will enable the dealer to rapidly assemble and permanently secure any given size of pulley on a hub having the required size of bore, the act of assembling the hub and pulley automatically establishing a driving relationship between the two.

My invention is characterized by the provision of a pulley having through a part of its thickness a central opening of one diameter and through the balance of its thickness a central opening of a smaller diameter, a hub inserted in said pulley having two corresponding cross-sectional diameters providing a shoulder for abutting against that portion of the pulley having the smaller opening, one of said openings and the portion of the hub mounted therein having non-circular engaging surfaces to effect a driving relationship between the hub and the pulley, and means for securing the pulley against the shoulder.

In its preferred embodiment, my improved pulley consists of a hub of one diameter having a non-circular portion and a circular portion of smaller diameter projecting from one side of the hub and affording a surrounding shoulder, and a pulley provided with a non-circular opening for a portion of its thickness to receive and engage over the non-circular portion of the hub and a circular opening extending through the remaining thickness of the hub and receiving the circular projecting portion of the hub, the end of the projecting portion being spun or crimped against the face of the pulley surrounding said circular opening to clamp the portion of the pulley containing said circular opening against the shoulder of the hub.

The principal idea of my invention is capable of being embodied in various forms as to the shape of the hub, and various ways of securing the pulley on the hub may be employed, illustrative embodiments of which are shown by the accompanying drawing, in which Fig. 1 is a view in elevation of the outer or rear side of a pulley constructed according to my invention and mounted on a shaft, the latter being shown in section; Fig. 2 is a similar view of the front side of said pulley; Fig. 3 is a cross-section on the line 3—3 of Fig. 1; Fig. 4 is a cross-section on an enlarged scale on the line 4—4 of Fig. 1, showing one means of securing the pulley on the hub; Fig. 5 is a view in side elevation of the hub shown in Fig. 4 before its connection to the pulley; Fig. 6 is a view similar to Fig. 4, showing a modification in the means of securing the pulley on the hub; Fig. 7 is a view in side elevation of the hub shown in Fig. 6; Fig. 8 is a view similar to Fig. 2 showing the central portion only of a pulley, and illustrating a modified form of the hub; Fig. 9 is a cross-section on an enlarged scale on the line 9—9 of Fig. 8; and Fig. 10 is a view in side elevation of the hub shown in Fig. 9.

Referring now to the drawing, the numeral 1, in all of the assembled views, indicates a shaft having a key-way 2 and on which a pulley 3 is adapted to be secured by means of a key 4 inserted in said key-way and in a similar key-way 5 provided in either form of the hub to be described. The pulley 3 consists of two flanged discs 6 and 7 secured together, preferably by spot-welding at the two circular series of points indicated by 8, and suitably shaped, when united, to form a V-groove, 3a. Each of these discs has welded to it a re-inforcing plate, 9, 10, respectively, being spot-welded thereto at the circular series of points indicated by 11. Each of the plates 9, 10 is provided near its periphery with a circular series of openings 12 to permit the discs 6 and 7 to be spot-welded through them at the inner series of points 8, as clearly shown in Figs. 1 and 2.

The preferred shape of the hub I prefer to employ is hexagonal, as shown in Figs. 2 and 5, and indicated by the numeral 13. This hub is made from bar-stock, bored out to fit the shaft on which it is to be mounted, and usually provided with a key-way 5, as stated above. The outside of the hub is turned down for a part of its length to a round cross-section, as indicated at 41 in Fig. 5. The hexagonal, or other non-circular portion, and the circular portion of the hub, each serves its own function, as will be described later.

Each of the discs 6 and 7 is provided with a hole in its central portion to accommodate the hub. The hole in the front disc 6 is hexagonal to snugly receive the hexagonal portion of the hub, and the hole in the rear disc 7 is circular, to receive the round portion 14 of the hub. Plates 9 and 10 have correspondingly shaped holes, as will be understood. The round portion 14 of the hub is adapted to protrude past the rear disc and plate for a distance of about one-fourth of an inch, and provides the means for clamping the rear disc 7 against the shoulder 15 of the hexagonal portion of the hub.

In assembling the disc and hub, the circular portion 14 is passed through the center of the pulley, that is through the circular hole in the disc 7 and plate 10, and the hexagonal portion 13 is inserted in the hexagonal opening of disc 6 and plate 9, with its shoulder 15 lying flush against the inner side of disc 7, all as clearly shown in Fig. 4. The pulley may be secured on the hub in any one of several ways, but preferably, and as indicated in Figs. 3, 4 and 9, by crimping or clinching the protruding portion 14 against the rear face of the pulley. To this end, the circular projection 14 is turned down so that the thickness of its wall surrounding the bore of the hub is about one-sixteenth of an inch, and after the discs 6 and 7 with their re-enforcing plates are inserted on it, a spinning tool is applied under pressure to its projecting end and the material of the projection bent back against the face of the re-enforcing plate 10, as indicated at 16 in Figs. 1, 4 and 9. When the pulley as thus assembled is secured on the shaft 1 by means of the key 4, a binding screw 17 will be screwed into engagement with the key, as usual.

While I prefer to employ a hub having a hexagonal shape, any other non-circular shape of hub may be employed. Thus in Figs. 8 and 10, I show a hub 18 generally circular in cross-section but provided with a flat side 19. When this shape of hub is used, the disc 6 and re-enforcing plate 9 will have an opening of the same shape as the hub; that is, one side of the opening will be made flat to engage the flat side 19 of the hub when inserted on it. This shape of hub will have the circular projection 14 previously described, and the pulley may be clamped to the hub by spinning the projection to cause it to be turned back to clamp or clinch the rear face of the pulley between itself and the shoulder 15 of the hub, as before.

Other means than that described, however, may be employed for securing the pulley on the hub. Thus, in Figs. 6 and 7 I have shown the projecting circular portion 14 as being screw-threaded, as indicated at 20, and having a binding nut 21 screwed thereon to clamp the disc 7 and re-enforcing plate 10 between the nut and the shoulder 15 on the hub.

In practice, in the use of the preferred form of the invention, each dealer would be provided with a spinning machine, and upon receipt of an order, would select a pulley of the desired diameter and a hub having the desired bore, putting them both in the spinning machine to crimp the hub protrusion against the rear of the pulley, in the manner just described, thus securing the two together.

It will be seen that the invention provides a hub with two cross-sectional shapes and permits the hexagonal or non-circular portion to extend through half the thickness of the pulley and the round portion to extend through the other half. The hexagonal, or other non-circular portion, being larger in diameter than the round portion, provides a shoulder, against which the rear disc of the pulley is clamped. This non-circular portion, co-operating with a like non-circular opening in the front disc, also serves to afford a driving relationship between the hub and the pulley. If both of these parts were round, the pulley would have a tendency to turn on the hub instead of turning with it.

I claim:

1. A pulley assembly comprising a pulley having a central opening circular on one side of the pulley and non-circular on the other, a bored hub having a circular portion extending into and projecting beyond said circular opening and a non-circular portion fitted in said non-circular opening, and means on the projecting circular portion for clamping the pulley against said non-circular portion.

2. A pulley assembly comprising a pulley having a central opening circular on one side of the pulley, and an enlarged and non-circular opening on the other, a bored hub having a central circular portion inserted in and projecting beyond said circular opening and a non-circular portion fitted in said non-circular opening and having a shoulder engaging the inner portion of the pulley surrounding said circular opening, and means on the projecting circular portion for clamping the pulley against said non-circular portion.

3. A pulley assembly comprising a pulley formed of two discs secured together and presenting a circumferential groove, one of said discs having a central circular opening and the other a central non-circular opening, a bored hub having a circular portion inserted into and projecting beyond said circular opening and a non-circular portion fitted in said non-circular opening, and means on the projecting circular portion for clamping the pulley against said non-circular portion.

4. A pulley assembly comprising a pulley having a central opening circular on one side of the pulley and hexagonal on the other, a bored hub having a circular portion extending into and projecting beyond said circular opening and a non-circular portion fitted in said non-circular opening, and means on the projecting circular portion for clamping the pulley against said non-circular portion.

5. A pulley assembly comprising a pulley formed of two discs secured together and presenting a circumferential groove, one of said discs having a central circular opening and the other a central opening larger than said circular opening and provided with a flat side, a bored hub having a reduced circular portion extending into and projecting beyond said circular opening and a portion having a flat side fitted into said larger opening, and means on the projecting circular portion for clamping the pulley against one side of the hub.

6. A pulley assembly consisting of two flanged discs secured together and presenting a circular circumferential groove, the rear disc having a round hole in its center and the front disc having a larger hole in its center provided with at least one non-circular portion, a bored hub having portions presenting two cross-sectional shapes, one portion to conform to the round opening in the rear disc and projecting beyond the same, and the other portion being larger in diameter and of a shape to conform to the opening in the front disc, whereby a driving relationship between the hub and pulley is secured, the projecting portion of said hub being spun back against the rear disc to clamp the pulley firmly against the side of the larger portion of said hub.

7. A pulley assembly comprising a bored hub having an enlarged portion of non-circular shape and a reduced circular portion projecting centrally from one face of said enlarged portion, a pulley comprising two discs secured together, one having an opening in its central portion fitted on the non-circular portion of the hub and the other disc having a circular opening in its central portion receiving the circular projecting portion of said hub, the end of said projecting portion being turned backward to clamp the latter disc against the face of said hub.

8. A pulley assembly comprising a pulley having a central opening extending through a part of its thickness and of one diameter, and a central opening extending through the balance of its thickness and of a smaller diameter, a hub inserted in said pulley having two corresponding cross-sectional diameters providing a shoulder for abutting against that portion of the pulley having the smaller opening, one part of the central portion of the pulley having a non-circular portion engaging a corresponding non-circular portion of the hub, whereby to establish a driving relationship therewith, and means for securing the pulley against said shoulder.

9. A pulley assembly comprising a pulley having a central opening extending through a part of its thickness and of one diameter, and a central opening extending through the balance of its thickness and of a smaller diameter, a hub inserted in said pulley having two corresponding cross-sectional diameters providing a shoulder for abutting against that portion of the pulley having the smaller opening, one part of the larger opening of the pulley being non-circular and engaging a corresponding non-circular part of the larger portion of the hub, whereby to establish a driving relationship therewith, and means for securing the pulley against said shoulder.

10. A pulley assembly comprising a pulley having a central opening extending through a part of its thickness and of one diameter, and a central opening extending through the balance of its thickness and of a smaller diameter, a hub inserted in said pulley having two corresponding cross-sectional diameters providing a shoulder for abutting against that portion of the pulley having the smaller opening, the central portion of the pulley and a corresponding portion of the hub having a non-rotatable engagement to establish a driving relationship between the two, and means for securing the pulley against said shoulder.

11. A pulley assembly comprising a pulley having a central opening extending through a part of its thickness and of one diameter, and a central opening extending through the balance of its thickness and of a smaller diameter, a hub inserted in said pulley having two corresponding cross-sectional diameters providing a shoulder for abutting against that portion of the pulley having the smaller opening, the central portion of the pulley having non-rotatable engagement with the hub, and means for securing the pulley against said shoulder.

ORVILLE MITCHELL.